US010259180B2

(12) United States Patent
Marchini et al.

(10) Patent No.: US 10,259,180 B2
(45) Date of Patent: Apr. 16, 2019

(54) PROCESS FOR MANUFACTURING A TYRE AND TOROIDAL SUPPORT FOR CARRYING OUT SAID PROCESS (71) Applicant: Pirelli Tyre S.p.A., Milan (IT)

(72) Inventors: Maurizio Marchini, Milan (IT); Pierangelo Misani, Milan (IT); Gianlorenzo Ferrari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 362 days.

(21) Appl. No.: 15/046,687

(22) Filed: Feb. 18, 2016

(65) Prior Publication Data

US 2016/0236432 A1    Aug. 18, 2016

Related U.S. Application Data (62) Division of application No. 10/579,561, filed as application No. PCT/EP03/13395 on Nov. 28, 2003, now Pat. No. 9,296,167.

(51) Int. Cl.
*B29D 30/06* (2006.01)
*B29D 30/12* (2006.01)
(Continued)

(52) U.S. Cl.
CPC .......... *B29D 30/0661* (2013.01); *B29C 35/02* (2013.01); *B29C 43/203* (2013.01);
(Continued)

(58) Field of Classification Search
CPC ............................ B29D 30/0661; B29D 30/12
(Continued)

(56) References Cited

U.S. PATENT DOCUMENTS 1,366,750 A * 1/1921 Smith et al. ....... B29D 30/0601
425/51
1,371,775 A * 3/1921 Cox ................... B29D 30/0661
425/51
(Continued)

FOREIGN PATENT DOCUMENTS

EP    0 893 237 A2    1/1999
EP    0 976 533 B1    11/2002
(Continued)

OTHER PUBLICATIONS

Apr. 23, 2010 Office Action from the India Patent Office for related application 2506/DELNP/2006.
(Continued)

*Primary Examiner* — James P Mackey
(74) *Attorney, Agent, or Firm* — Finnegan, Henderson, Farabow, Garrett & Dunner, LLP (57) ABSTRACT

A process for manufacturing a tire by the steps of producing and assembling the tire structural elements on a toroidal support to form a green tire, and the step of precuring at least an inner surface of the green tire by heating the toroidal support. The radially inner surface of the toroidal support is provided with a plurality of protruding elements to reduce the time required for the outer surface of the toroidal support to reach a temperature which is suitable for ensuring a uniform and homogeneous precuring of the inner surface of the green tire, preferably of the inner surface and the bead regions of the green tire.

17 Claims, 6 Drawing Sheets (51) Int. Cl.
  *B29D 30/00* (2006.01)
  *B29C 35/02* (2006.01)
  *B29C 43/20* (2006.01)
  *B29C 59/00* (2006.01)
  *B29D 30/36* (2006.01)

(52) U.S. Cl.
  CPC ........ *B29C 59/002* (2013.01); *B29D 30/0005* (2013.01); *B29D 30/12* (2013.01); *B29D 30/36* (2013.01); *B29D 2030/0677* (2013.01)

(58) Field of Classification Search
  USPC ..................................................... 425/54, 55
  See application file for complete search history.

(56) References Cited

U.S. PATENT DOCUMENTS

| | | | |
|---|---|---|---|
| 1,394,928 A | | 10/1921 | Midgley et al. |
| 1,409,995 A | * | 3/1922 | Bosworth .............. B29D 30/12 29/416 |
| 1,862,655 A | * | 6/1932 | Bostwick ............... B29D 30/12 156/417 |
| 1,975,038 A | * | 9/1934 | Glazner ............. B29D 30/0654 425/27 |
| 2,695,424 A | * | 11/1954 | Madison ........... B29D 30/0654 277/646 |
| 3,970,416 A | * | 7/1976 | Mattson ............. B29D 30/0654 425/52 |
| 4,083,672 A | | 4/1978 | Vaishnav |
| 4,248,287 A | | 2/1981 | Christman |
| 4,382,757 A | | 5/1983 | Roy et al. |
| 4,548,050 A | | 10/1985 | Drucker |
| 5,201,975 A | | 4/1993 | Holroyd et al. |
| 5,937,517 A | | 8/1999 | Smith et al. |
| 6,113,833 A | * | 9/2000 | Ogawa ................... B29D 30/12 156/110.1 |
| 6,332,999 B1 | * | 12/2001 | Caretta ................ B29C 43/104 156/110.1 |
| 6,757,955 B2 | * | 7/2004 | Scarzello ............... B29D 30/10 29/426.1 |
| 7,597,837 B2 | * | 10/2009 | Caretta ................ B29C 43/104 156/123 |

FOREIGN PATENT DOCUMENTS

| | | |
|---|---|---|
| EP | 0 928 680 B1 | 3/2003 |
| EP | 0 976 534 A3 | 9/2003 |
| EP | 0 976 534 B1 | 10/2003 |
| EP | 1 075 929 B1 | 5/2004 |
| JP | 11-320567 | 11/1999 |
| JP | 2003-503235 | 1/2003 |
| JP | 2003-118010 | 4/2003 |
| WO | WO 01/00395 A1 | 1/2001 |
| WO | WO 01/62480 A1 | 8/2001 |
| WO | WO 01/62481 A1 | 8/2001 |

OTHER PUBLICATIONS

Sep. 6, 2012 Hearing notice from the India Patent Office for related application 2506/DELNP/2006.
Jun. 29, 2010 Office Action from Korean Intellectual Property Office for related 10-2006-7009093.

* cited by examiner

PROCESS FOR MANUFACTURING A TYRE AND TOROIDAL SUPPORT FOR CARRYING OUT SAID PROCESS

CROSS REFERENCE TO RELATED APPLICATIONS

This is a division of application Ser. No. 10/579,561, filed Mar. 2, 2007 which is a national phase application based on PCT/EP2003/013395, filed Nov. 28, 2003, the content of both of which is incorporated herein by reference.

BACKGROUND OF THE INVENTION

Field of the Invention

The present invention relates to a process for manufacturing a tyre. In particular, the present invention relates to a process for manufacturing a tyre comprising the steps of producing and assembling the tyre structural elements on a toroidal support and the step of precuring at least an inner surface of a green tyre by heating the toroidal support.

Furthermore, the present invention relates to a toroidal support to be used in a process for manufacturing a tyre.

Description of the Related Art

In the present description, the term "green tyre" is used to indicate the product which is obtained upon assembling tyre structural elements which include an elastomeric material in an uncured state.

Moreover, in the present description, the term "inner surface" of the tyre is used to indicate the innermost surface of the tyre which, when the tyre is cured and operatively mounted on a wheel rim, comes into contact with the inflating fluid of the tyre.

The tyre manufacturing process according to the present invention comprises the step of manufacturing a green tyre by consecutively producing and assembling together on a toroidal support the tyre structural elements. Such a manufacturing process is described, for instance, in the European Patent EP-928,680—in the name of the same Applicant—according to which the toroidal support is moved, preferably by a robotized system, between a plurality of work stations in each of which, through automated sequences, a particular building step of the tyre is carried out.

The manufacturing process further comprises the step of moulding the green tyre, so as to confer to the latter a desired geometrical conformation, and the step of curing the green tyre, so as to consolidate it. The step of moulding further confers to the green tyre a desired tread pattern.

The moulding and curing steps of the green tyre are carried out by introducing the latter into a moulding cavity defined within a vulcanization mould, whose inner shape matches the shape of the outer surface of the tyre to be obtained, and by introducing a pressurized fluid into a diffusion interspace (or diffusion gap) obtained between the inner surface of the green tyre and the outer surface of the toroidal support.

Such a tyre manufacturing process is described, for instance, in the European Patent EP-976,533 in the name of the same Applicant, according to which, during the pressing of the raw elastomer material against the inner walls of the moulding cavity, a radial expansion is imposed to the tyre by effect of the introduction into the diffusion gap of a pressurized fluid. The introduction of the pressurized fluid is preferably carried out by means of feeding channels (or ducts) formed in the toroidal support and terminating at the outer surface of the latter. During the fluid introduction, the tyre is sealingly engaged at its circumferential inner edges between the inner walls of the moulding cavity and the outer surface of the toroidal support, so as to delimit the diffusion gap at the circumferential inner edges of the tyre itself. Advantageously, the heat amount which is necessary for curing the green tyre is provided to the latter through the walls of the moulding cavity and by means of a heating fluid which is introduced into the diffusion gap. Preferably, the heating fluid is the pressurized fluid used for carrying out the pressing step or is at least part of said pressurized fluid.

Therefore, in accordance with this process, the manufacturing of a tyre is carried out in the absence of a vulcanization bladder which is commonly employed in conventional tyre manufacturing processes. The bladder is generally made of rubber and is inflated with a high-pressure heated fluid, e.g. steam, and inserted into the green tyre, enclosed in the moulding cavity, in order to press the tyre against the inner walls of the moulding cavity and to provide the tyre with the desired stable geometric conformation as a result of the cross-linking process to which the elastomer material forming the tyre is submitted.

However, in processes without a vulcanization bladder as described above, the pressurized fluid directly comes into contact with the inner surface of the green tyre, fact which may cause a plurality of inconveniences due to possible permeation of the fluid into the tyre structure not yet vulcanized. For instance, separations between adjacent elastomeric layers or strip-like elements, or between the elastomeric material and the metallic or textile reinforcing structures may occur, or even corrosion phenomena in the metallic reinforcing materials may be promoted.

In order to prevent possible permeation of the pressurized fluid into the green tyre, document EP-976,534—in the name of the same Applicant—describes a tyre manufacturing process comprising the step of associating at least one layer of precured elastomeric material with the inner surface of the green tyre. Said precured layer is suitable for obtaining a sufficient mechanical strength to diffusion and penetration of the pressurized fluid and, at the same time, a high fatigue strength, in particular during the moulding step of the tyre in order to avoid formation of fissures and cracks. Therefore, according to said document, the tyre manufacturing process comprises the step of forming at least one layer of raw elastomeric material on the outer surface of the toroidal support so that the successive manufacturing of the green tyre is carried out on the toroidal support carrying said layer of raw elastomeric material. Furthermore, the tyre manufacturing process comprises the step of precuring said layer before introducing the green tyre into the vulcanization mould, said precuring step being carried out by supplying heat to said layer through the toroidal support.

Preferably, the heating of the toroidal support is achieved thanks to the fact that the toroidal support comes from, a previous vulcanization cycle or by means of infrared rays or equivalent means, such as electric resistors.

For example, document EP-1,075,929 discloses a process for manufacturing a tyre according to which a rigid toroidal support is used, the latter consisting of a plurality of sectors. According to said document, a portion of each sector is moulded in a thermally conductive material (e.g., an aluminum alloy) and incorporates an—electrical resistance for providing heat to the green tyre during the curing step.

A further example is described in document JP 11-320, 567 according to which each sector of a toroidal support is contacted, in correspondence of the inner surface thereof, with a circular segment provided with resistor heaters so that a heat amount is supplied to the outer, surface of the toroidal support from the inner surface thereof for curing a green tyre.

The Applicant has observed that the step of precuring a layer of raw elastomeric material, commonly referred to as "liner", i.e. the elastomeric layer which is suitable for ensuring the retention of the tyre inflating fluid, is particularly advantageous also during the conformation of the tyre since the precured liner is provided with high and uniform mechanical resistance.

This is particularly evident in the case 'the liner is obtained by winding an elastomeric strip on the outer surface of a toroidal support, as described, for instance, in the European Patent EP-928,680 mentioned above. In that case, in fact, since the pressurized fluid exiting from the feeding channels provided within the toroidal support does not uniformly impact onto the liner surface, the fluid may cause dishomogeneities on the inner surface of the tyre and even a disuniform conformation of the tyre.

Moreover, the Applicant has observed that the tyre structural elements of elastomer material still in an uncured state, i.e. in a plastic state, when coming into contact with the pressurized fluid, may take an anomalous arrangement with respect to the design specifications.

In particular, the Applicant has noted that, especially at the very beginning of the moulding step, the carcass ply or plies may remarkably move from their expected positions in the bead regions due to the expansion to which the tyre is submitted by the pressurized fluid. Consequently, tensioning of the carcass ply or plies in the finished tyre—said tensioning being mainly determined by the moulding step—is inevitably lower than expected.

Furthermore, the Applicant has noticed that, especially in the early stages of the moulding step, the vulcanization pressure may give rise to phenomena of lack or accumulation of elastomeric material, in particular in the tyre bead regions. As a consequence of said phenomena, disuniformities and defects may occur in the tyre thereby causing the latter to be discarded.

SUMMARY OF THE INVENTION

To solve the above problems, the Applicant has perceived that it is necessary to improve the heat exchange from the toroidal support to the inner surface of the green tyre, so as to reduce the time required for the outer surface of the toroidal support to reach a temperature which is suitable for ensuring a uniform and homogeneous precuring of at least the liner, preferably of the liner and of the tyre bead regions.

The Applicant has found that it is possible to increase the heat exchange between the toroidal support and the inner surface of the green tyre by providing at least a portion of the radially inner surface of the toroidal support with a plurality of protruding elements.

In particular, the Applicant has found that, by providing the radially inner surface of the toroidal support with a plurality of protruding elements, the heat exchange can be advantageously improved since said protruding elements contribute in remarkably increasing the toroidal surface which is suitable for performing the heating of the green tyre.

In accordance with the present-invention, the protruding elements allow the outer surface of the toroidal support to quickly reach a predetermined working temperature which is suitable for ensuring that the precuring step can be correctly performed and the drawbacks mentioned above do not arise.

Furthermore, the Applicant has found that, by providing the radially inner surface of the toroidal support with the protruding elements mentioned above, the precuring time can be advantageously reduced. As a consequence, the tyre vulcanization time as well as the energy which is necessary for heating the toroidal support are advantageously reduced.

Moreover, the plurality of protruding elements mentioned above contributes in remarkably decreasing the time which is necessary for cooling the toroidal support at the end of the vulcanization process since said protruding elements improve the heat exchange between the hot toroidal support and the environment surrounding the latter. In fact, it has to be noted that, at the end of the vulcanization process, the temperature of the toroidal support is of about 140-150° C. and it is necessary that said temperature decreases to about 40-60° C. before starting the manufacturing of a new raw tyre by deposition of the liner.

In a first aspect the present invention relates to a process for manufacturing a tyre comprising the steps of:
providing an elastomeric layer on an outer surface of a toroidal support, said surface having a shape substantially matching a shape of an inner surface of said tyre;
manufacturing a green tyre by assembling the structural elements thereof on the toroidal support provided with the elastomeric layer;
introducing the green tyre supported on the toroidal support into a moulding cavity whose inner walls have a shape substantially matching a shape of an outer surface of the tyre;
at least partially precuring the elastomeric layer by heating the toroidal support;
introducing a primary working fluid into at least one diffusion gap defined between the inner surface of the green tyre and the toroidal support in order to press the outer surface of the green tyre against the inner walls of the moulding cavity, and
curing the green tyre,
wherein at least a portion of the radially inner surface of the toroidal support is provided with a plurality of protruding elements.

In accordance with the present invention, the protruding elements jut from the radially inner surface of the toroidal support. In more details, the protruding elements protrude inwardly from the toroidal support.

Preferably, the protruding elements are elongated ribs.

Alternatively, the protruding elements may define a honeycomb structure.

Preferably, the protruding elements are obtained in the thickness of the toroidal support.

Alternatively, the protruding elements are produced separately from the toroidal support and successively coupled to the radially inner surface thereof. Preferably, the coupling of the protruding elements to the toroidal support is performed by welding.

According to a first embodiment, the heating of the toroidal support is carried out as soon as the elastomeric layer is completed on the outer surface of the toroidal support. According to a further embodiment, the heating of the toroidal support is carried out at the end of the step of manufacturing the green tyre on the toroidal support. According to said embodiment, the tyre manufacturing process comprises the step of producing the green tyre by assembling together the tyre structural elements and subsequently precuring at least the inner surface of the tyre, preferably the inner surface of the tyre and the bead regions, before introducing the green tyre into the moulding cavity where the moulding and curing steps are performed.

Furthermore, in accordance with the present invention, the Applicant has found that the thickness—in the radial direction—of the toroidal support can be advantageously reduced, with respect to the thickness of traditional toroidal supports, in order to increase the heat exchange between the toroidal support and the inner surface of the green tyre, the thickness reduction contributing in decreasing the thermal inertia of the toroidal support.

In particular, the Applicant has found that the thickness of the portion of the toroidal support corresponding to the crown portion of the tyre can be advantageously reduced.

Moreover, the thickness of the toroidal support is further advantageously reduced where it is provided with the protruding elements of the present invention.

In a further aspect the present invention relates to a toroidal support for manufacturing a green tyre thereupon, the support comprising a plurality of circumferential sectors defining the outer surface of the toroidal support, said-outer surface having a shape which substantially matches the shape of the inner surface of the green tyre, wherein at least a portion of the radially inner surface of the toroidal support is provided with a plurality of protruding elements.

According to an embodiment of the present invention, the lateral inner surfaces of the toroidal support are concave, the concavity of said surfaces being directed inwardly of the toroidal support. In particular, the lateral inner surfaces of the toroidal support are substantially parallel to the radially outer profile of the toroidal support.

According to said embodiment, the Applicant has found that also the thickness of the toroidal support portion corresponding to the tyre sidewalls can be reduced and the heat exchange from the toroidal support to the green tyre can be advantageously improved.

According to a further embodiment of the present invention, the lateral inner surfaces of the toroidal support are substantially parallel to the equatorial plane of the toroidal support.

The Applicant has found that said further embodiment allows the water—possibly formed by condensation of the steam flow introduced into the toroidal support—to be easily eliminated so as to avoid water accumulation into the toroidal support, said water negatively affecting the heat exchange from the toroidal support to the inner surface of the green tyre.

BRIEF DESCRIPTION OF THE DRAWINGS

The description will be set out hereinafter with reference to the accompanying drawings, given by way of non-limiting examples, in which.

DETAILED DESCRIPTION OF THE INVENTION

A tyre generally comprises a toroidally shaped carcass including one or more carcass plies, strengthened with reinforcing cords lying in radial planes, i.e. in planes containing the rotation axis of the tyre. Each carcass ply has its ends integrally associated with at least one annular reinforcing metal structure, usually known as bead core.

Placed crownwise to the carcass structure, the tyre generally comprises a tread band of elastomer material into which, at the end of the moulding and curing steps, a raised tread pattern is formed for the tyre ground contact.

Furthermore, the tyre comprises a reinforcing structure, usually known as belt structure, which is placed between the carcass structure and the tread band. The belt structure usually comprises at least two radially superposed strips of rubberised fabric provided with reinforcing cords, usually of metal material, disposed parallel to each other in each strip and in crossed relationship with the cords of the adjacent strip, preferably symmetrically disposed with respect to the equatorial plane of the tyre.

Preferably, said belt structure further comprises, at a radially external position thereof, a further layer of textile or metallic cords substantially circumferentially disposed.

Finally, in tyres of the tubeless type, i.e. devoid of an air tube, a radially inner elastomeric layer, i.e. the liner, is present which has imperviousness features to ensure the tyre air-tightness.

Figure 1:
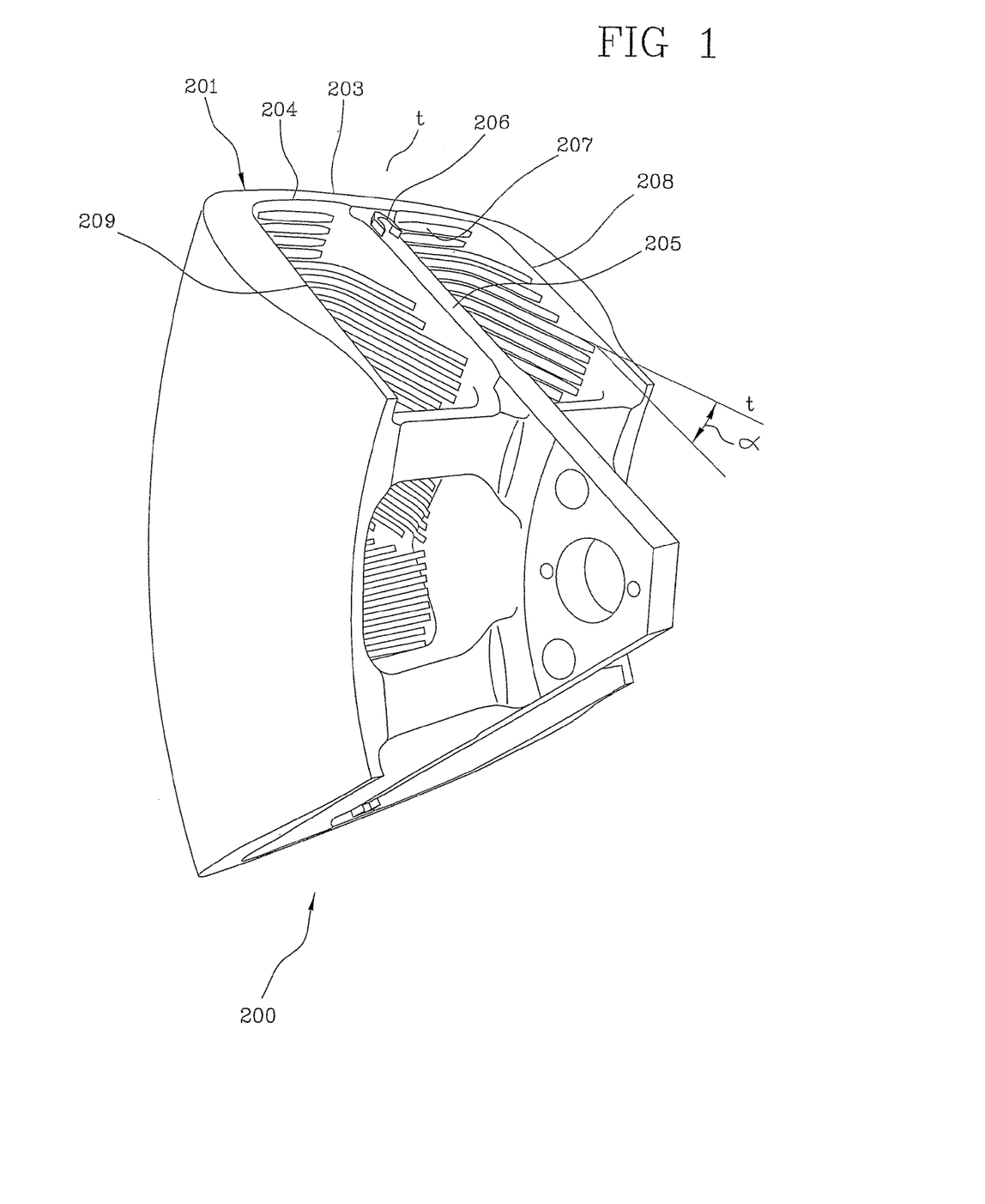
FIG. 1 is a perspective view of a portion of a sector of a toroidal support in accordance with a preferred embodiment of the present invention.

FIG. 1 shows a schematic perspective view of a portion of one sector 200 of a toroidal support in accordance with a preferred embodiment of the present invention.

Generally, a toroidal support of the collapsible or dismountable type is provided with a plurality of circumferential sectors which are circumferentially distributed around a common geometric axis—which coincides with the rotation axis of the tyre when the latter is supported on the toroidal support—so as to define a continuous outer surface substantially-reproducing the radially inner surface of a tyre. In a toroidal support of the collapsible or dismountable type the sectors can be individually retracted in a radial direction, towards said geometric axis, for disengagement from the tyre at the end of the moulding and curing steps of the tyre manufacturing process. Such a dismountable toroidal support is described, for instance, in document WO 01/62481 in the name of the same Applicant.

With reference to FIG. 1, sector 200 is delimited in the circumferential direction between two circumferential sides 201, 202 (in FIG. 1 only circumferential side 201 is shown).

In a transverse cross-section—i.e. in a section obtained by intersecting the toroidal support with a plane perpendicular to the equatorial plane of the toroidal support—each sector 200 has a substantially U-shaped profile, the crown portion of which—corresponding to the crown portion of the tyre—is delimited between an outer side 203 and an inner side 204.

The outer side 203—which is part of the circumferential side 201 or 202—defines the crown portion of the radially outer profile of the sector 200 and cooperates, together with the other sectors, in defining the outer surface of the toroidal support.

The inner side 204, substantially facing the geometric axis of the toroidal support, is substantially parallel to the outer side 203.

The design of the individual sectors 200 gives to the toroidal support—taken as a whole—an inner hollow structure which is open towards the geometric axis so that a flow of steam or another operating fluid reaches the inner side 204 of each sector 200 and a suitable heat amount is transferred to the tyre through the thickness of the main body of the sector.

The mutual positioning of the sectors 200 is obtained by providing engagement devices which comprise, for each sector, at least one attachment plate 205 radially projecting from the inner side 204 of the sector, preferably in a plane substantially parallel to the equatorial plane of the toroidal support. Each attachment plate 205 is preferably provided with one or more through slots 206—which are close to the inner side 204 of the sector—in order not to hinder the flowing of the operating fluid during vulcanization. The attachment plates 205 are engaged—by means of flanges (not shown)—to at least one attachment member (not shown) which is preferably made in the form of a shank, coaxial with the geometric axis, and to which each sector is associated to form the toroidal support.

According to the present invention, each sector 200 of the toroidal support is provided with a plurality of protruding elements 207 which are distributed on at least a portion of the radially inner surface of the sector.

In the embodiment of FIG. 1, the protruding elements 207 are in the form of elongated ribs.

According to the embodiment shown in FIG. 1, the elongated ribs 207 are distributed on the whole radially inner surface of each sector 200. In more details, the elongated ribs 207 are distributed on the radially inner surface of the sector which corresponds to and delimits the crown portion of the tyre, as well as on the radially inner lateral surfaces of the sector which correspond to and delimit the tyre sidewalls.

Figure 2:
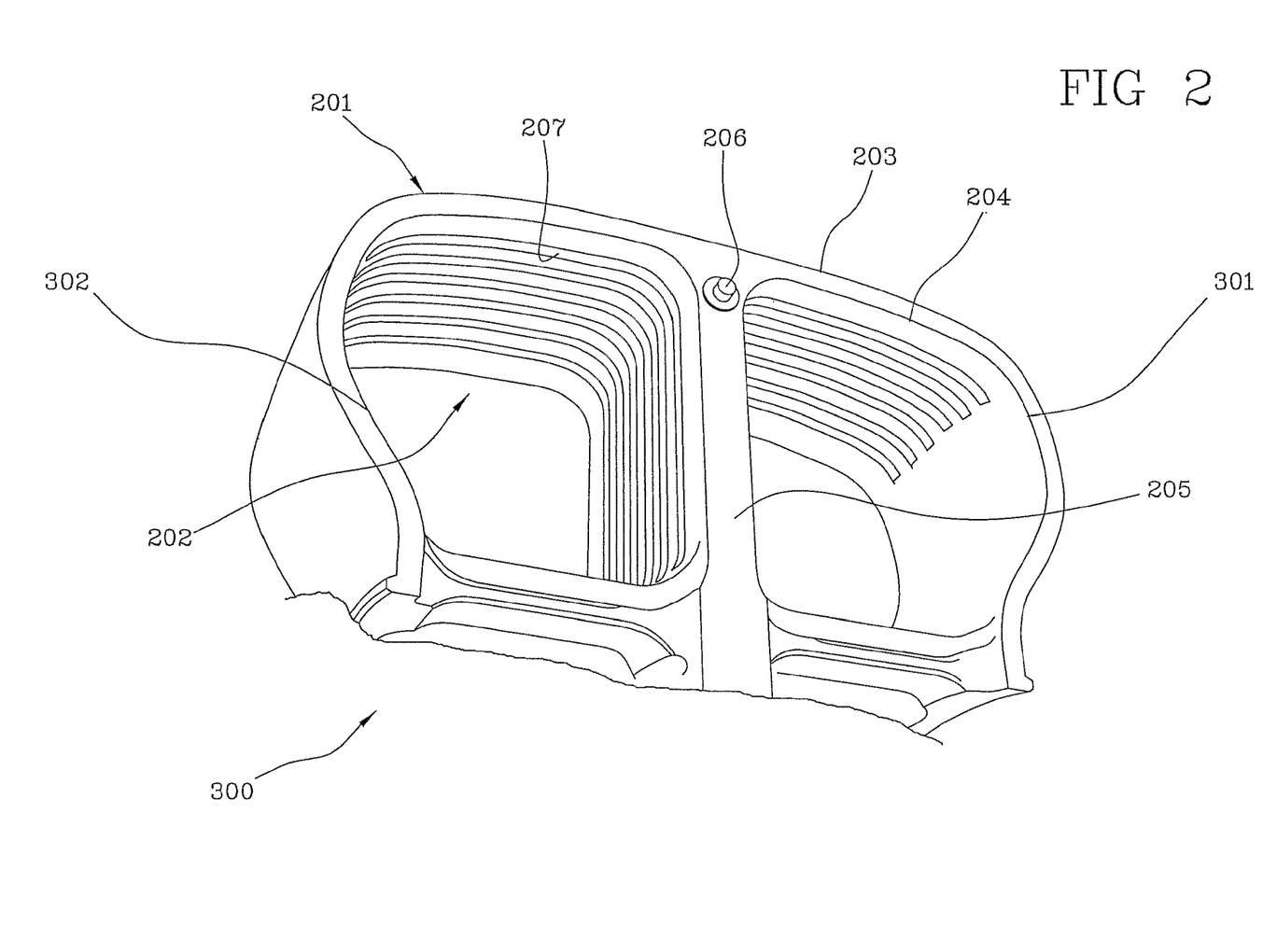
FIG. 2 is a perspective view of a portion of a sector of a toroidal support in accordance with a further embodiment of the present invention.

Alternatively, the elongated ribs 207 are distributed only on the radially inner surface of the sector which corresponds to and delimits the crown portion of the tyre, as shown in FIG. 2 where reference is made to sector 300 in accordance with a further embodiment of the present invention.

Alternatively, the elongated ribs 207 are distributed only on the radially inner lateral surfaces of the sector which correspond to and delimit the tyre sidewalls (said further embodiment being not shown).

According to the embodiment of FIG. 1, the elongated ribs 207 are also distributed on the outer surfaces of the attachment plates 205, said outer surfaces facing the inner hollow structure of the toroidal support.

Preferably, the elongated ribs 207 are disposed parallel to each other.

Preferably, the elongated ribs 207 are disposed parallel to each other in each portion of the radially inner surface of the sector.

Preferably, the pitch—i.e. the distance—between two successive elongated ribs is substantially constant along the development thereof.

Preferably, the elongated ribs 207, that are distributed on the radially inner surface of the sector corresponding to the crown portion of the tyre, lie in a plane substantially perpendicular to the equatorial plane of the toroidal support. Moreover, preferably said elongated ribs 207 extend in a direction substantially perpendicular to a circumferential direction.

Alternatively, the elongated ribs—that are distributed on the radially inner surface of the sector—extend in a direction substantially parallel to a circumferential direction.

Preferably, the elongated ribs 207, that are distributed on the inner lateral surfaces of the sector corresponding to the tyre sidewalls, lie in a plane substantially parallel to the equatorial plane of the toroidal support. This embodiment is particularly preferred since it ensures that the heat exchange is uniformly distributed over the whole external surface of the toroidal support Alternatively, according to the embodiment shown in FIG. 1, the elongated ribs 207, that are distributed on the inner lateral surfaces of the sector corresponding to the tyre sidewalls, lie in a plane t-t which is inclined of an angle α with respect to a plane parallel to the equatorial plane of the toroidal support. Preferably, the angle α is substantially constant along the development of the rib on the inner lateral surfaces of the sector. Preferably, the angle α ranges from 0° to 45°.

Alternatively, the angle α varies along the development of the rib on the inner lateral surfaces of the sector, the value of said angle increasing in moving away from the equatorial plane of the toroidal support.

The inclination of the elongated ribs 207, and thus the formation of the angle α, is essentially due to the fact—that said elongated ribs are preferably obtained by milling the radially inner surface of the sector. The use of a milling machine, to be operated within the hollow cavity of the toroidal support in order to obtain the elongated ribs in the thickness of the toroidal support, requires the elongated ribs to be made inclined.

Preferably, the elongated ribs are substantially continuous along the radially inner surface of the sector, as shown in FIGS. 1 and 2.

Alternatively, the elongated ribs present at least one interruption along their longitudinal development (said further embodiment being not shown in the figures).

Preferably, the external profile of the protruding elements (i.e. of elongated ribs 207 in accordance with the embodiments shown in FIGS. 1 and 2), in a cross-section transversal to the longitudinal development thereof, is substantially rectangular in shape. Preferably, the height of said elongated ribs is from about 30% to about 50% of the sector thickness at the crown portion. Preferably, the width of said elongated ribs is comprised between 2 mm and 5 mm.

Alternatively, the external profile of the elongated ribs 207, in a cross-section transversal to the longitudinal development thereof, is substantially trapezoidal in shape, this shape contributing in improving the sector surface which is suitable for the heat exchange.

Alternatively, the external profile of the elongated ribs 207, in a cross-section transversal to the longitudinal development thereof, is substantially triangular in shape.

According to the embodiment shown in FIG. 1, the lateral inner surfaces 208, 209 of the toroidal support are substantially parallel to the equatorial plane of the toroidal support.

According to the further embodiment shown in FIG. 2, the lateral inner surfaces 301, 302 of the toroidal support have a concave profile, the concavity being directed inwardly of the toroidal support. Preferably the lateral inner surfaces 301, 302 of the toroidal support are substantially parallel to the radially outer profile 201 of the toroidal support.

The manufacturing process according to the present invention comprises the step of manufacturing a green tyre by consecutively assembling together on a toroidal support the tyre structural elements (as disclosed, for instance, in the European Patent EP-928,680 mentioned above).

According to said process, a plurality of through holes (not shown in the figures) are usually manufactured through the toroidal support thickness to form feeding channels (or ducts) which enable the pressurized primary working fluid to reach the diffusion gap—that is obtained between the outer surface of the toroidal support and the inner surface of the tyre—during the vulcanization process. Generally, said through holes have a diameter ranging from 1 mm to 3 mm.

The Applicant has also provided for a further tyre manufacturing process according to which the step of precuring the inner surface of the green tyre and the bead regions thereof is obtained by simultaneously pressing the green tyre from the outside to the inside and by supplying heat to the inner surface of the tyre. According to said further process the moulding and curing steps can be performed without causing inhomogeneities and irregularities in the finished tyre since the working fluid during the moulding and curing steps is in direct contact with parts of the tyre that have already been partly vulcanised and therefore no longer exhibit a plastic behaviour of the material but an almost elastic one. In this case it can be obtained a uniform distribution against the inner walls of the mould of the elastomer material belonging to the outermost structural elements of the tyre.

In addition, said further tyre manufacturing process allows that tensioning of the carcass ply or plies, due to the vulcanisation pressure, does not cause the carcass ply or plies to move at the tyre bead regions since the carcass ply or plies have already become substantially integral with the elastomer materials present in these regions thanks to a partial vulcanisation of the same.

In more details, said further tyre manufacturing process comprises the steps of: building a green tyre on a toroidal support having an outer surface whose shape substantially matches that of the inner surface of the green tyre; heating the toroidal support to transmit heat to the inner surface of the tyre in contact with the toroidal support; pressing the inner surface of the green tyre against the outer surface of the toroidal support through at least one secondary pressurized working fluid; pressing an outer surface, of the green tyre against the inner walls of a vulcanisation mould defining a moulding cavity, said pressing step being performed through a primary pressurized working fluid passing in at least one diffusion gap between the outer surface of the toroidal support and the inner surface of the green tyre, the primary working fluid being heated so as to supply heat to the green tyre to cause vulcanisation thereof.

With reference to said manufacturing process, the Applicant has noticed that a criticity may arise in correspondence of the tyre buttress areas, i.e. the areas where the axially opposite edges of the tread band are joined to the respective sidewalls of the tyre.

In more details, the Applicant has noticed that, when the tyre is positioned inside of the moulding cavity—the mould defining the cavity being always in a heated state—and the step of precuring is carried out as disclosed above, in correspondence of the tyre buttress areas at least a portion of the tread band comes into contact with the heated mould and begins to be moulded and cured.

Furthermore, the Applicant has noticed that a further portion of the tread band which is axially adjacent to the tread band portion that comes into contact with the heated mould begins to be cured too due to its proximity to the heated mould.

Therefore, part of the tyre tread band begins to be moulded and cured when the step of pressing the outer surface of the green tyre against the inner walls of the vulcanisation mould has not started yet, i.e. when the tyre is not completely toroidally shaped.

As a consequence, when the tyre is toroidally conformed by the primary working fluid and the moulding and curing steps take place, the presence of tread band portions which have already been partially moulded and cured may cause the formation of bubbles within the elastomeric material. In particular, the air possibly present within the tread band—especially among the elastomeric strips the tread band is formed of—remains entrapped by the cured portions and thus bubbles and/or other defects (such as detachments of said strips) may occur and cause the tyre to be discarded.

With reference to said further manufacturing process disclosed above, in order to avoid a premature moulding and curing of portions of the tread band, the Applicant has firstly thought to reduce the precuring time so as to lower the residence time of the green tyre within the moulding cavity before the moulding and curing steps are carried out.

However, the Applicant experienced that the precuring time could not be lowered below a certain value. In fact, the Applicant has noted that, if the precuring time is set to be too low, defects in the tyre liner arise which are principally due to an insufficient precuring thereof. In particular, the Applicant has noted that, in case the elastomeric material of the liner is not precured to a sufficient degree, the latter may adhere to the toroidal support and, when the primary working fluid is introduced to cause the radial expansion of the tyre, the formation of undesired wrinkles in the liner may occur.

Furthermore, the Applicant experienced that, in case the precuring time is remarkably reduced, the precuring of the tyre bead regions does not occur or is insufficient and the carcass plies may move in the bead regions when the moulding and curing steps are performed.

The Applicant perceived that the drawbacks mentioned above can be advantageously avoided and a sufficient precuring of the liner and of the bead regions can be performed by improving the heat exchange between the toroidal support and the inner surface of the green tyre in accordance with the present invention.

According to said further tyre manufacturing process described above, the toroidal support is provided with a plurality of ducts opening onto the outer surface thereof, said ducts being suitable for introducing the primary working fluid into the diffusion gap. The ducts are conveniently sized and distributed on the circumferential extension of the toroidal support so that introduction of the crude elastomeric material of the liner into said toroidal support—through said ducts—is prevented. Usually, the ducts are through holes obtained in the radial thickness of the toroidal support, as described, e.g., in EP-976, 533.

Alternatively, the toroidal support is devoid of said ducts and the primary working fluid is allowed to pass—from the interior of the toroidal support to the diffusion gap mentioned above—only through the passages present between two adjacent sectors.

Alternatively, in order to facilitate the passage of the primary working fluid, the circumferential sides 201, 202 of the sectors are provided with notches (not shown in the figures) that extend radially along the whole thickness of the sector.

Preferably, only one circumferential side of each sector is provided with said notches.

Preferably, said notches are in the number of two for each sector.

Preferably, said notches are symmetrically located with respect to the equatorial plane of the toroidal support.

Preferably, said notches have a width—in the axial direction—of about 20 mm and an extension in the circumferential direction of about 0.1 mm.

The Applicant has found that the presence of said notches is very useful also at the end of the curing step when the toroidal support has to be dismounted. In fact, in the absence of said notches, the Applicant has noted that an amount of working fluid remains trapped in the diffusion gap and can not exit from the passages defined between two adjacent sectors. This is particularly undesirable since the trapped working fluid may cause a sealing effect among the sectors which may hinder the dismounting of the toroidal support and even cause the breaking of the sectors thereof.

Figure 3:
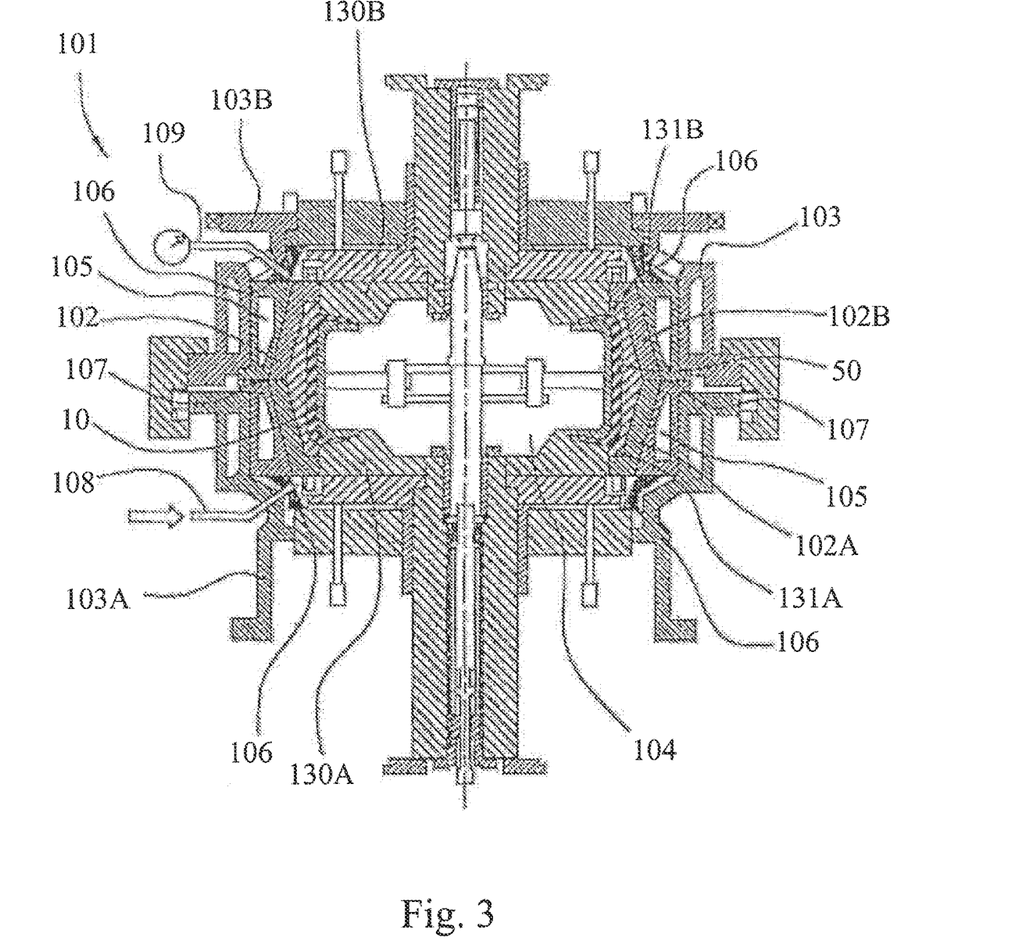
FIG. 3 is a vertical view partly in section of an apparatus carrying out a step of a tyre manufacturing process according to the present invention.

FIG. 3 shows a moulding and curing apparatus for vehicle wheel tyres according to the present invention, said apparatus being generally identified by reference number 101.

Apparatus 101 comprises a vulcanisation mould 102 operatively associated with an airtight container 103.

Preferably, the mould 102 can be made up of a lower half 102A and an upper half 102B, in engagement with a base 103A and a closing portion 103B of container 103, respectively.

In the embodiment of FIG. 3, each of the lower 102A and upper 102B halves of mould 102 has a cheek, a lower cheek 130A and an upper cheek 130B respectively, and a crown of sectors consisting of a lower sector 131A and an upper sector 131B, respectively.

Figure 4:
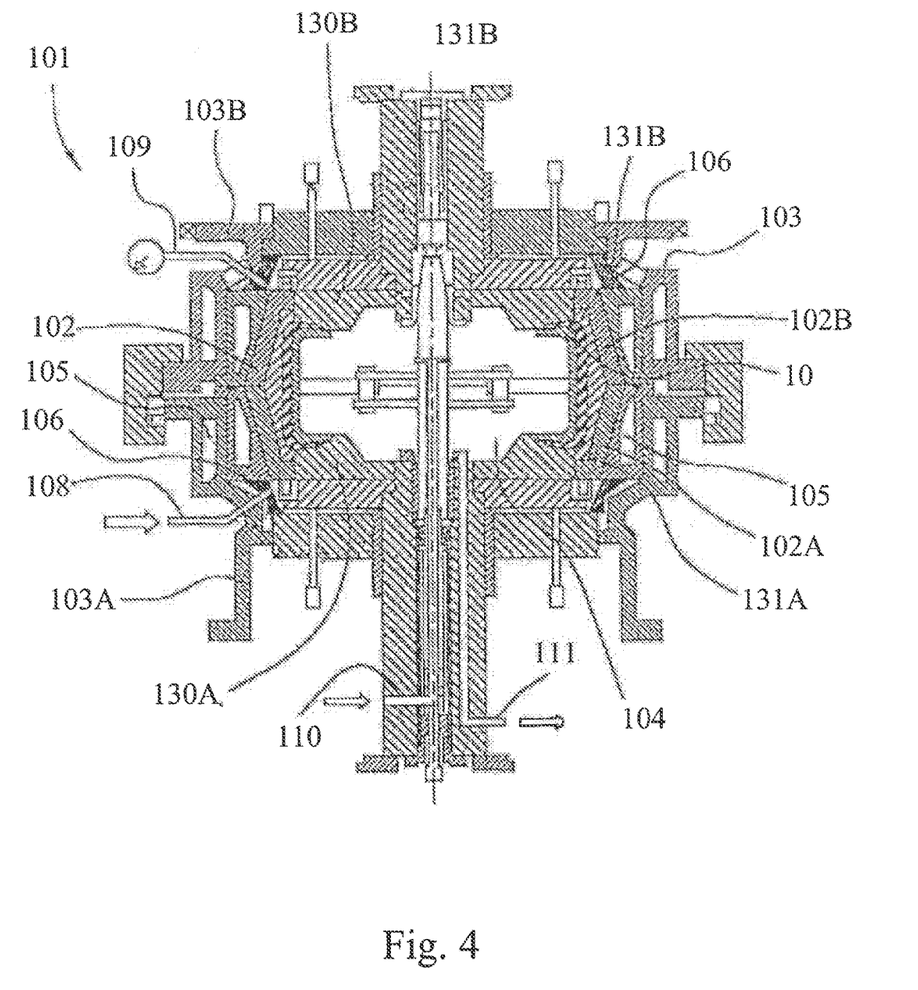
FIG. 4 is a vertical view partly in section of the apparatus of FIG. 3 during a further step of said tyre manufacturing process.

The lower 102A and upper 102B halves are mutually movable between an open position, at which they are spaced apart from each other (as shown in FIG. 3), and a closed position, at which they are close to each other to form a moulding cavity 104 (as shown in FIG. 4). The inner walls of the moulding cavity 104—defined by said cheeks and said sectors—reproduce the geometric configuration of the outer surface of a tyre to be obtained at the end of the moulding and curing steps.

In more details, the cheeks are designed to form the outer surfaces of the opposite tyre sidewalls, whereas the sectors are designed to form the tyre tread band, by creating therein a series of cuts and longitudinal and/or transverse grooves suitably disposed in accordance with a desired tread pattern.

Apparatus 101 further comprises a toroidal support 10 of metal or other rigid material, having an outer surface substantially reproducing the shape of the inner surface of the tyre, the toroidal support 10 being of the type shown in FIG. 1 or in FIG. 2 in accordance with the present invention.

Apparatus 101 further comprises at least one duct 110 (shown in FIG. 4) for the introduction of a primary working fluid which may comprise steam, nitrogen, air or other gases substantially inert at the working conditions, or mixtures thereof. Preferably, the primary working fluid is a mixture of steam and nitrogen.

The apparatus 101 is also provided with heating devices for heating the mould 102. Preferably said heating, devices consist of a plurality of ducts 105 suitable for the flowing of a heating fluid.

Preferably, apparatus 101 also comprises an airtight device adapted to contain the toroidal support on which a green tyre 50 has been previously manufactured.

As shown in FIGS. 3 and 4, in a preferred embodiment said airtight device can be enclosed and integrated into said mould 102, defining an airtight cavity within the same. Preferably in this case the mould 102 comprises a plurality of seals 106 disposed close to vents for escape of the primary working fluid employed for vulcanisation of said tyre, and at least one circumferential seal 107 placed on the opposite surfaces of the two halves 102A and 102B.

Said circumferential seal 107 may consist of an O-ring or preferably of a series of superposed metal rings provided between their opposite surfaces, with a sealing element capable of withstanding the pressures and temperatures of the method described in the following.

According to this embodiment, a feeding device for a secondary working fluid is operatively associated with the mould 102. Said device comprises at least one delivery duct 108 and one discharge duct 109 to respectively feed into and evacuate from the mould 102 the secondary pressurized working fluid. Said secondary working fluid, which presses the inner surface of the green tyre 50 from the outside to the inside against the outer surface of the toroidal support 10, can be air, nitrogen or a further substantially inert gas.

Duct 110 is operatively associated with at least one passage device, for example through a connecting duct (not shown), formed along at least one of the centering shanks of said toroidal support 10, to enable diffusion of said primary working fluid within the toroidal support 10.

Said passage device comprises ducts formed in the toroidal support, through which said primary working fluid reaches a plurality of through holes opening onto the outer surface of the toroidal support, conveniently distributed and sized on the circumferential extension thereof as mentioned above.

Preferably, a duct 111 adapted to discharge possible condensate is provided at the lower part of the moulding cavity 104.

In accordance with said further tyre manufacturing process, the green tyre 50 is manufactured on the toroidal support 10 and successively inserted into the airtight vulcanisation mould 102 arranged in an open condition.

Operation of apparatus 101, once said toroidal support 10 carrying the green tyre 50 has been placed into the mould 102, involves closure of the apparatus itself and starting of the moulding and curing operations.

More specifically, by duct 108 the secondary fluid is introduced into the gap defined between the outer surface of the green tyre 50 and the inner surface of the mould 102. Substantially simultaneously, by duct 110 the primary working fluid under pressure is introduced into the toroidal support 10 to a lower pressure than that of the secondary working fluid. The transient has a duration included between 30 seconds and 1 minute; in a steady-state condition and for a duration of 30 seconds to 6 minutes, the pressure differential is lower than 10 bar, preferably of about 1-2 bar. Since the primary working fluid is of lower pressure, it will remain within the toroidal support 10 without escaping through the previously illustrated ducts. In this way during this step the green tyre 50 is pressed from the outside to the inside so that its inner surface is pressed against the outer surface of the toroidal support 10.

Preferably the secondary working fluid is at room temperature and at a pressure generally included between 8 and 18 bar, while the primary working fluid is at a pressure lower than 16 bar and at a temperature generally included between approximately 170° C. and 210° C.

For example, the transient can last about one minute, the pressure of the secondary working fluid in a steady-state condition is about 16 bar and the pressure of the primary working fluid is about 14 bar, the differential pressure therefore being about 2 bar.

In a steady-state condition this step lasts some minutes (for example about two minutes). During this period of time the primary working fluid heats the toroidal support 10 which transmits heat to the inner surface of the tyre, and consequently to the liner and the bead regions. This heating does not fully cure said parts of the tyre but at all events it is sufficient to give the parts themselves features of elasticity. In particular, the carcass ply or plies are well anchored to the beads and the inner tyre surface, preferably the liner, becomes elastic enough to withstand without tearing the pressure of the moulding and curing steps.

The step of pressing the inner surface of the green tyre 50 against the outer surface of the toroidal support 10 may take place indifferently before, after, or simultaneously with heating of the toroidal support.

Termination of this step involves evacuation of the secondary working fluid through the discharge duct 109, preferably in a period of time shorter than 2 minutes (for example 1 minute).

If mould 102 is airtight, a subsequent step immediately starts for moulding and fully curing said tyre. Said step begins through raising of said primary working fluid pressure to a value included between 18 and 35 bar, preferably 26-28 bar, for the purpose of moulding and curing the tyre with the desired tensioning of the carcass ply.

Pressure generated by the primary working fluid reaches the diffusion gap obtained between the outer surface of the toroidal support 10 and the inner surface of the tyre to be cured.

According to said further tyre manufacturing process disclosed above, although in the absence of an inflatable bladder, the precured liner has good elasticity features and the primary working fluid pressure can be transmitted to the whole tyre in a substantially uniform manner. Therefore, thanks to a uniform moulding, a vulcanised tyre substantially meeting the nominal design features can be obtained.

It is to be noted that during the pressing step from the outside to the inside of the inner tyre surface against the outer surface of the toroidal support 10, heating of the inner tyre surface can be carried out by use of the primary working fluid, or by generation of heat in the toroidal support itself by means of electric resistors, for example. In this case, pressure of the secondary working fluid can also be of few bar (even 2 or 3), provided the differential pressure is within the above stated range.

For further description of the invention, some illustrative examples are given below.

Examples 1 to 3

The Applicant has carried out a finite element analysis (F.E.A.) on three toroidal supports having different geometries of the sectors thereof.

In more details, the Applicant has carried out a numerical simulation of the thermal behaviour of the three different toroidal supports in order to evaluate which geometry is suitable for increasing the heat exchange between the toroidal support and the inner surface of the green tyre.

In particular, the objective of the Applicant's simulations was that of comparing the different sector geometries in terms of time which is necessary to the toroidal support for reaching a thermal steady condition.

The simulations were carried out by employing three toroidal supports suitable for a tyre having size of 235/65 R17, said toroidal supports being made from aluminum (having a thermal conductivity of about 200 W/(m*K)).

The simulations were carried out at the following conditions:

1) steam temperature inside of the hollow cavity of the toroidal support of about 180° C.;
2) environmental temperature surrounding the toroidal support of about 50° C.

The three toroidal supports which have been tested where the following:

a) a toroidal support having a geometry similar to that of the toroidal support shown in FIG. 1, but without the protruding elements (comparative example: Example 1);
b) the toroidal support shown in FIG. 1 (embodiment 1 of the invention: Example 2);
c) the toroidal support shown in FIG. 2 (embodiment 2 of the invention: Example 3).

According to the embodiments 1 and 2 of Examples 2 and 3 respectively, the protruding elements were in the form of elongated ribs as shown in the FIGS. 1 and 2.

Figure 5:
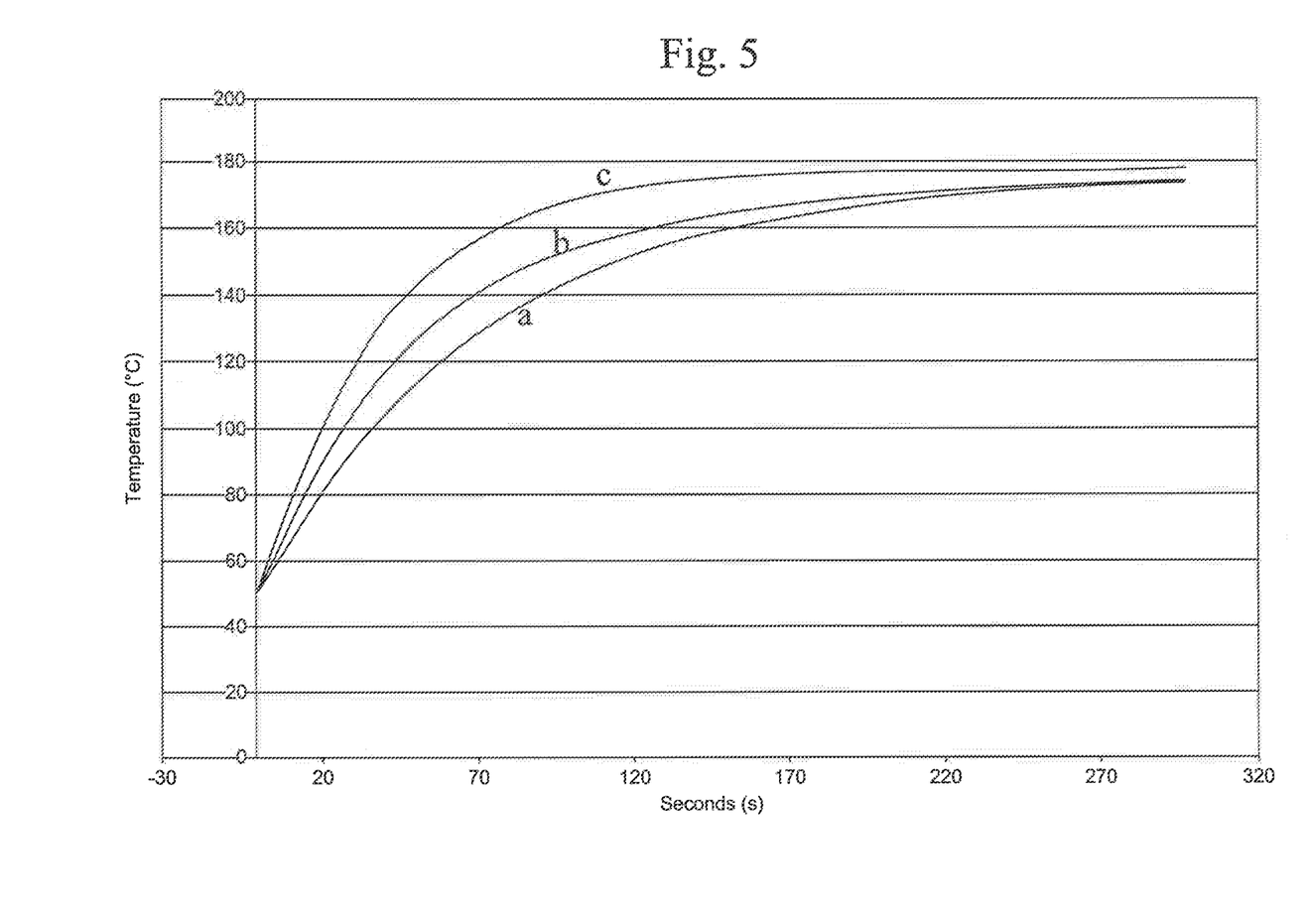
FIGS. 5 and 6 show the graphics of the temperature as a function of time with reference to three different toroidal supports.
Figure 6:
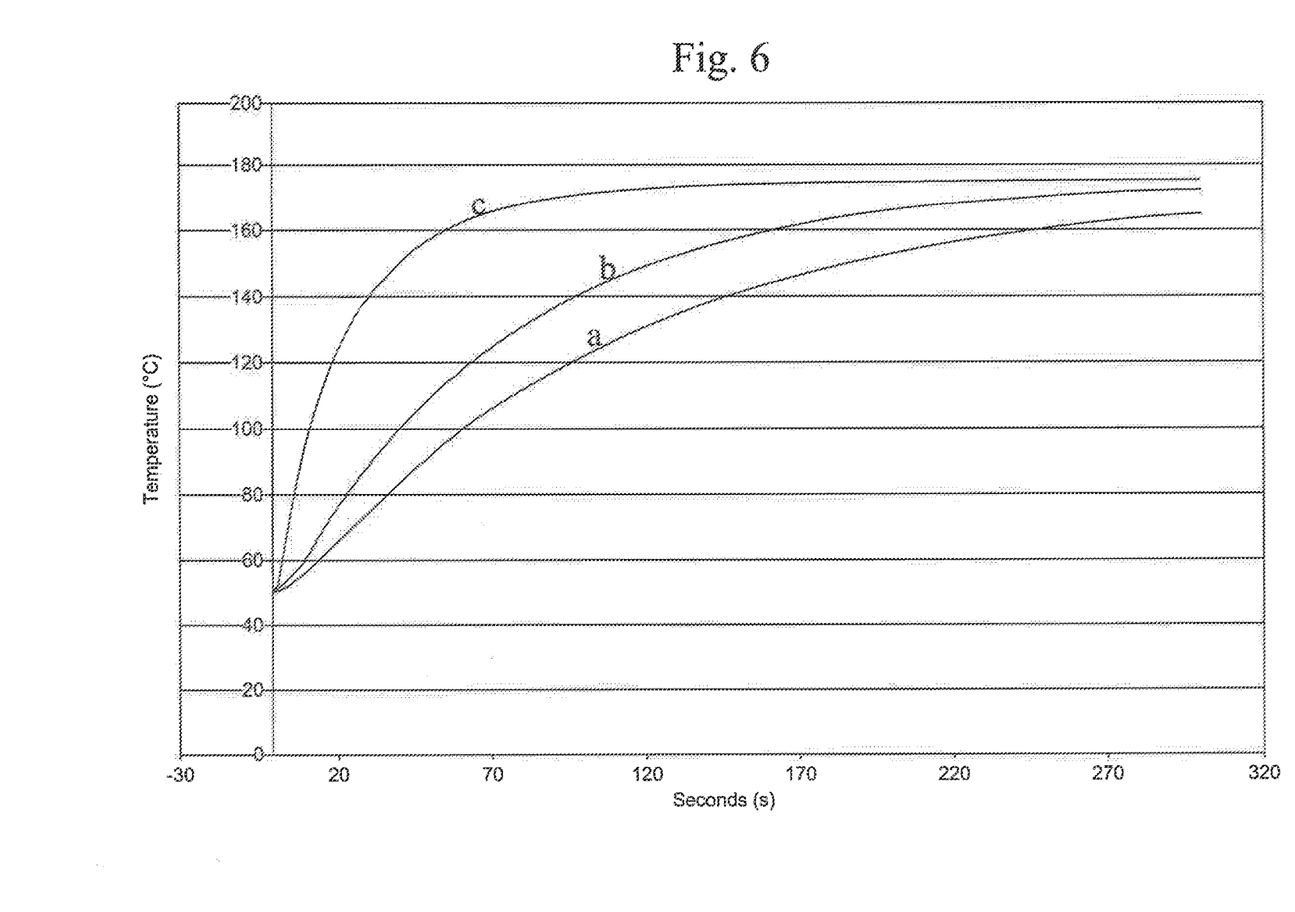

FIGS. 5 and 6 show how the temperature of the outer surface of the toroidal support varies as a function of time on the equatorial plane of the toroidal support (FIG. 5) and on the toroidal support area corresponding to the tyre buttress area (FIG. 6) respectively.

In FIGS. 5 and 6 the curves "a" to "c" correspond respectively to the geometries of the Examples 1 to 3 disclosed above.

From FIGS. 5 and 6 it can be derived that, by providing the toroidal support with a plurality of protruding elements in accordance with the present invention, the toroidal support reaches a thermal steady-condition (in the FIGS. 5 and 6 a plateau corresponding to a temperature of about 180° C. is shown) much more quickly than a standard toroidal support not provided with said protruding elements.

Furthermore, it can be noted that the best results in terms of improvement in the heat exchange between the toroidal support and the inner surface of the green tyre are achieved especially in correspondence of the tyre buttress area.

The invention claimed is:

1. A toroidal support for manufacturing a green tyre thereupon, the support comprising a plurality of circumferential sectors circumferentially distributed around a common geometric axis, the plurality of circumferential sectors defining an outer surface of the toroidal support, said outer surface having a shape which substantially matches the shape of an inner surface of said green tyre, and an inner hollow cavity contoured by a radially inner surface of the toroidal support, said inner hollow cavity being open towards the geometric axis, wherein each circumferential sector comprises at least one attachment plate radially projecting from the radially inner surface of the toroidal support in a plane substantially parallel to an equatorial plane of the toroidal support, wherein at least a portion of the radially inner surface of the toroidal support corresponding to a crown portion of the green tyre is provided with a plurality of protruding elements in the form of elongated ribs each lying in a plane substantially perpendicular to the equatorial plane of the toroidal support, wherein, in a cross-section transversal to a longitudinal development thereof, a height of each elongated rib is from 30% to 50% of a sector thickness at the inner surface corresponding to the crown portion, and a width of each elongated ribs is comprised between 2 mm and 5 mm.

2. The toroidal support according to claim 1, wherein the protruding elements protrude inwardly within the toroidal support.

3. The toroidal support according to claim 1, wherein the protruding elements are obtained in a thickness of the toroidal support.

4. The toroidal support according to claim 1, wherein the protruding elements are produced separately from the toroidal support and successively coupled to the radially inner surface thereof.

5. The toroidal support according to claim 4, wherein the coupling of the protruding elements to the toroidal support is performed by welding.

6. The toroidal support according to claim 1, wherein the protruding elements are further distributed on the radially inner lateral surface of the toroidal support corresponding to sidewalls of the green tyre.

7. The toroidal support according to claim 1, wherein the protruding elements are further distributed on outer surfaces of the at least one attachment plate.

8. The toroidal support according to claim 1, wherein the protruding elements are disposed parallel to each other.

9. The toroidal support according to claim 1, wherein a pitch between two successive protruding elements is substantially constant along a development of said protruding elements.

10. The toroidal support according to claim 6, wherein each of the protruding elements, which are distributed on the radially inner lateral surfaces of the toroidal support corresponding to sidewalls of the green tyre, lie in a plane which is inclined at an angle with respect to a plane parallel to an equatorial plane of the toroidal support.

11. The toroidal support according to claim 10, wherein said angle is 0° to 45°.

12. The toroidal support according to claim 10, wherein said angle is substantially constant along a development of the protruding elements.

13. The toroidal support according to claim 10, wherein said angle increases in moving away from the equatorial plane of the toroidal support.

14. The toroidal support according to claim 1, wherein the protruding elements are continuous along the radially inner surface of the toroidal support.

15. The toroidal support according to claim 1, wherein at least a portion of the radially inner surface of the toroidal support corresponding to a sidewall of the green tyre is concave.

16. The toroidal support according to claim 15, wherein the portion of the radially inner surface of the toroidal support corresponding to the sidewall of the green tyre is parallel to a radially outer profile of the toroidal support.

17. The toroidal support according to claim 1, wherein at least a portion of the radially inner surface of the toroidal support corresponding to a sidewall of the green tyre is parallel to the equatorial plane of the toroidal support.

* * * * *